United States Patent
Lee et al.

(10) Patent No.: US 7,502,216 B2
(45) Date of Patent: Mar. 10, 2009

(54) MULTILAYER CHIP CAPACITOR

(75) Inventors: Byoung Hwa Lee, Gyunngi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/010,018

(22) Filed: Jan. 18, 2008

(65) Prior Publication Data

US 2009/0034154 A1   Feb. 5, 2009

(30) Foreign Application Priority Data

Aug. 6, 2007   (KR) ...................... 10-2007-0078398

(51) Int. Cl.
   *H01G 4/228* (2006.01)
(52) U.S. Cl. .............. 361/306.3; 361/306.1; 361/306.2; 361/308.1; 361/321.1; 361/321.2
(58) Field of Classification Search .............. 361/306.3, 361/306.1, 306.2, 302–305, 311–313, 321.1, 361/321.2, 308.1
   See application file for complete search history.

(56) References Cited

U.S. PATENT DOCUMENTS

| | | | |
|---|---|---|---|
| 5,880,925 A | | 3/1999 | DuPre et al. |
| 6,038,121 A | * | 3/2000 | Naito et al. .................. 361/303 |
| 6,243,253 B1 | * | 6/2001 | DuPre et al. ............. 361/306.3 |
| 6,282,079 B1 | * | 8/2001 | Nagakari et al. ............ 361/303 |
| 6,407,904 B1 | * | 6/2002 | Kuroda et al. ............... 361/303 |
| 6,441,459 B1 | | 8/2002 | Togashi et al. |
| 6,762,925 B2 | * | 7/2004 | Uchida et al. ............. 361/321.1 |
| 6,829,134 B2 | * | 12/2004 | Yamauchi et al. ........... 361/303 |
| 7,035,079 B1 | * | 4/2006 | Park et al. .................... 362/303 |
| 7,224,572 B2 | * | 5/2007 | Togashi et al. ........... 361/306.3 |
| 7,292,430 B2 | * | 11/2007 | Lee et al. ................. 361/306.3 |
| 2007/0109717 A1 | | 5/2007 | Lee et al. |

FOREIGN PATENT DOCUMENTS

| | | |
|---|---|---|
| JP | 2007-123505 | 5/2007 |
| KR | 10-2007-0052656 | 5/2007 |

\* cited by examiner

*Primary Examiner*—Nguyen T Ha
(74) *Attorney, Agent, or Firm*—McDermott Will & Emery LLP

(57) ABSTRACT

A multilayer chip capacitor includes: a capacitor body; internal electrodes disposed in the capacitor body, each internal electrode having one or more lead; and external electrodes disposed on first and second side surfaces of the capacitor body to be electrically connected to the internal electrodes through the leads. The average number of leads in each internal electrode is smaller than half (½) of the total number of external electrodes. The leads of the internal electrodes having opposite polarities and adjacent in the lamination direction are disposed to be adjacent to each other as seen from the lamination direction. All the internal electrodes having the same polarity are electrically connected to each other in the capacitor.

20 Claims, 15 Drawing Sheets

MULTILAYER CHIP CAPACITOR

CROSS-REFERENCE TO RELATED APPLICATIONS

This application claims the priority of Korean Patent Application No. 2007-78398 filed on Aug. 6, 2007, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multilayer chip capacitor capable of reducing equivalent series inductance (ESL), maintaining a suitable equivalent series resistance (ESR), and allowing electrostatic capacitance thereof to be easily tested.

2. Description of the Related Art

A multilayer chip capacitor is useful for a decoupling capacitor in a power supply circuit of a LSI or a capacitive component for removing a high-frequency noise from signal lines. In order to stabilize the power supply circuit, the multilayer chip capacitor is required to have a low equivalent series inductance (ESL). This requirement is further increased as electronic apparatuses tend to be operated in a high frequency and a high current. The stability of the power supply circuit greatly depends on an equivalent series resistance (ESR) as well as the ESL of the multilayer chip capacitor. If the ESR has a too small value, the stability of the power supply circuit deteriorates, so that the supplied voltage is severely fluctuated. Therefore, it is preferable that the ESR is chosen to have a suitable value.

In U.S. Pat. No. 5,880,925, there is disclosed a technology of reducing the ESL by using an interdigitated arrangement where leads of first and second internal electrodes having opposite polarities are interdigitated. FIG. 1A is a perspective exploded view illustrating a structure of internal electrodes of a conventional multilayer chip capacitor 50, and FIG. 1B is a perspective view illustrating an outer appearance of the multilayer chip capacitor 50 of FIG. 1A.

Referring to FIG. 1A, a first and second internal electrodes 12 and 13 having opposite polarities are disposed on dielectric layers 11a and 11b. A capacitor body 20 is formed by alternately laminating the dielectric layers 11a and 11b. Internal electrodes 12 and 13 are connected to external electrodes 31 and 32 through leads 16 and 17, respectively (see FIG. 1B). The lead 16 of the first internal electrode 12 and the lead 17 of the second internal electrode 13 are disposed to be adjacent to each other in an interdigitated arrangement. Since polarities of voltages supplied to the adjacent leads are different, magnetic fluxes generated from high frequency currents flowing through the external electrodes are cancelled between the adjacent leads, so that the ESL can be reduced.

Each of the internal electrodes 12 and 13 has four leads. Since resistances formed by the four leads are connected to each other in parallel, a total resistance of the multilayer chip capacitor becomes very low. As a result, the ESR of the multilayer chip capacitor also has a too small value. The excessive decrease in ESR causes instability of the power supply circuit.

In U.S. Pat. No. 6,441,459, there is proposed a technology for preventing the excessive decrease in ESR by using only one lead in each internal electrode. However, according to the US patent, since only one lead is provided to each internal electrode, the ESL is relatively increased. In addition, all the internal electrodes having the same polarities are not electrically connected to each other in the multilayer chip capacitor, so that electrostatic capacitance of the multilayer chip capacitor cannot be easily tested or measured.

SUMMARY OF THE INVENTION

An aspect of the present invention provides a multiple-terminal multilayer chip capacitor capable of maintaining a suitable equivalent series resistance (ESR), preventing an instability of a power supply circuit caused from an excessive decrease in ESR, further reducing equivalent series inductance (ESL), and allowing electrostatic capacitance thereof to be easily tested.

According to an aspect of the present invention, there is provided a multilayer chip capacitor comprising: a capacitor body formed by laminating a plurality of dielectric layers; a plurality of internal electrodes disposed in the capacitor body, each of the internal electrodes having one or more lead drawn to a side surface of the capacitor body, the internal electrodes of opposite polarities alternately disposed to face each other with the dielectric layer interposed therebetween; a plurality of external electrodes disposed on first and second side surfaces facing each other of the capacitor body to extend in a lamination direction and to be electrically connected to the internal electrodes through the leads, the external electrodes of opposite polarities alternately disposed on each of the first and second side surfaces; wherein the internal electrodes constitute a plurality of blocks stacked repeatedly one atop another, each of the blocks including a plurality of the internal electrodes which are arranged successively in the lamination direction, wherein an average number of leads in each internal electrode is smaller than half of the total number of the external electrodes, and wherein the leads of the internal electrodes having opposite polarities and adjacent in the lamination direction are disposed to be adjacent to each other as seen from the lamination direction, and wherein all the internal electrodes having the same polarity are electrically connected to each other by the external electrodes.

In the above aspect of the present invention, each of the internal electrodes may have two leads of the one lead drawn to the first side surface and the other lead drawn to the second side surface. In each of the internal electrodes, the one lead drawn to the first side surface may be offset by a distance between adjacent external electrodes from a position facing the lead drawn to the second side surface. The leads drawn to each of the first and second side surfaces may be disposed in a zigzag arrangement in the lamination direction as seen from each side surface.

The multilayer chip capacitor may be an 8-terminal capacitor having four external electrodes on each of the first and second side surfaces, wherein the first to fourth external electrodes may be sequentially disposed on the first side surface, and the fifth to eighth external electrodes may be sequentially disposed on the second side surface.

In the 8-terminal capacitor, the first to sixth internal electrodes (six internal electrodes) may be sequentially laminated to constitute each of the blocks.

In addition, each of the first to sixth internal electrodes may have two leads of the one lead drawn to the first side surface and the other lead drawn to the second side surface, wherein the leads of the first to fourth internal electrodes drawn to the first side surface may be disposed to be connected to the first to fourth external electrodes, the leads of the fifth internal electrode drawn to the first side surface are disposed to the third external electrode, and the leads of the sixth internal electrode drawn to the first side surface are disposed to second external electrode. The leads drawn to the second side surface may be disposed in a zigzag arrangement in the lamination direction between the fifth external electrode and the eighth external electrode as seen from the second side surface. In each of the internal electrodes, the lead drawn to the second side surface may be offset by a distance between adjacent external electrodes from a position facing the lead drawn to the first side surface.

Alternatively, in the 8-terminal capacitor, eight internal electrodes may be sequentially laminated to constitute each of the blocks.

In a case where the eight internal electrodes constitute each of the blocks, each of the internal electrodes may have two leads. Particularly, each of the two internal electrodes among the eight internal electrodes may have two leads drawn to the first side surface, each of the other two internal electrodes may have two leads drawn to the second side surface, and each of the remaining four internal electrodes may have two leads of the one lead drawn to the first side surface and the other drawn to the second side surface.

In a case where the eight internal electrodes constitute each of the blocks, each of the internal electrodes may have at least one lead and at most four leads. As a first example, each of the internal electrodes may have three or two leads. As a second example, each of the internal electrodes may have three leads. As a third example, each of the internal electrodes may have three or four leads.

Alternatively, in the 8-terminal capacitor, ten internal electrodes may be sequentially laminated to constitute each of the blocks.

In a case where the ten internal electrodes constitute each of the blocks, each of the internal electrodes may have one lead or four leads. Particularly, each of the two internal electrodes among the ten internal electrodes may have four leads, and each of the remaining eight internal electrodes may have one lead. The eight internal electrodes having one lead may include four internal electrodes having a lead drawn to the first side surface and four internal electrodes having a lead drawn to the second side surface.

The multilayer chip capacitor may be a 6-terminal capacitor having three external electrodes on each of the first and second side surfaces.

In the 6-terminal capacitor, eight internal electrodes may be sequentially laminated to constitute each of the blocks.

In this case, each of the two internal electrodes among the eight internal electrodes may have three leads, and each of the remaining six internal electrodes may have one lead. The six internal electrodes having one lead may include three internal electrodes having a lead drawn to the first side surface and three internal electrodes having a lead drawn to the second side surface.

Alternatively, in the 6-terminal capacitor, six internal electrodes may be sequentially laminated to constitute each block.

In a case where the six internal electrodes constitute each of the blocks, each of the internal electrodes may have two leads.

Alternatively, in a case where the six internal electrodes constitute each of the blocks, each of the internal electrodes may have two or three leads.

Particularly, each of the three internal electrodes among the six internal electrodes may have two leads, and each of the remaining three internal electrodes may have three leads.

According to the aspects of the present invention, an average number of leads in each internal electrode is smaller than half (½) of the total number of external electrodes. Therefore, an excessively reduced ESR can be prevented. In addition, the leads of the up-down-direction adjacent opposite-polarity internal electrodes are disposed to be adjacent to each other in a horizontal direction. Therefore, the increase in ESL can be suppressed. In addition, all the internal electrodes having the same polarity are electrically connected to each other in the multilayer chip capacitor. Therefore, electrostatic capacitance of the multilayer chip capacitor can be easily tested or measured.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
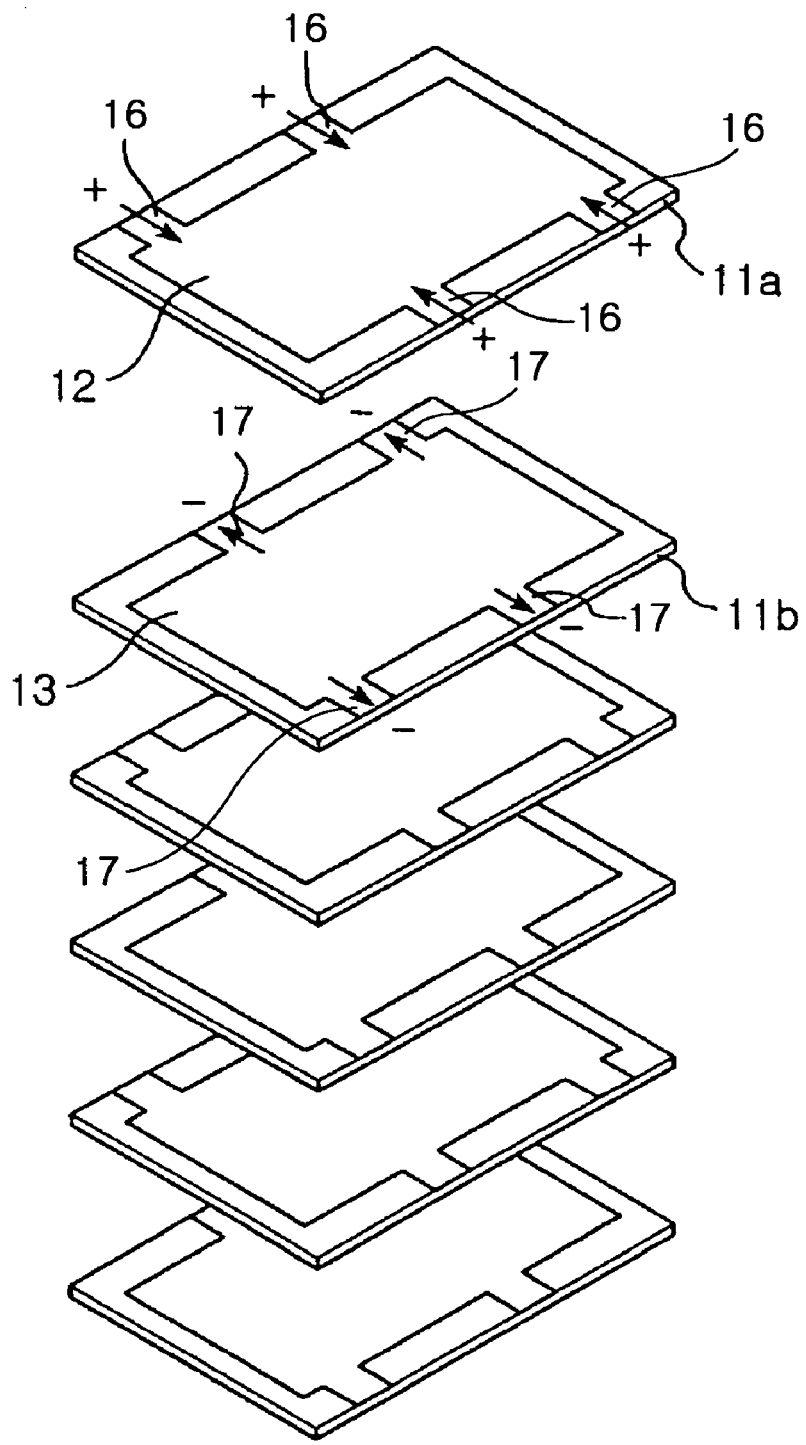
FIG. 1A is a perspective exploded view illustrating a structure of internal electrodes of a conventional multilayer chip capacitor.

Hereinafter, exemplary embodiments of the present invention will now be described in detail with reference to the accompanying drawings. The embodiments of the present invention may be modified in various forms, and the scope of the present invention is not limited to the embodiments. The embodiments of the present invention are provided in order that the ordinarily skilled in the art can have the better understanding of the present invention. In the accompanying drawings, shapes and sizes of elements may be exaggerated for clarifying of the present invention, and like reference numerals denote like elements.

Figure 2:
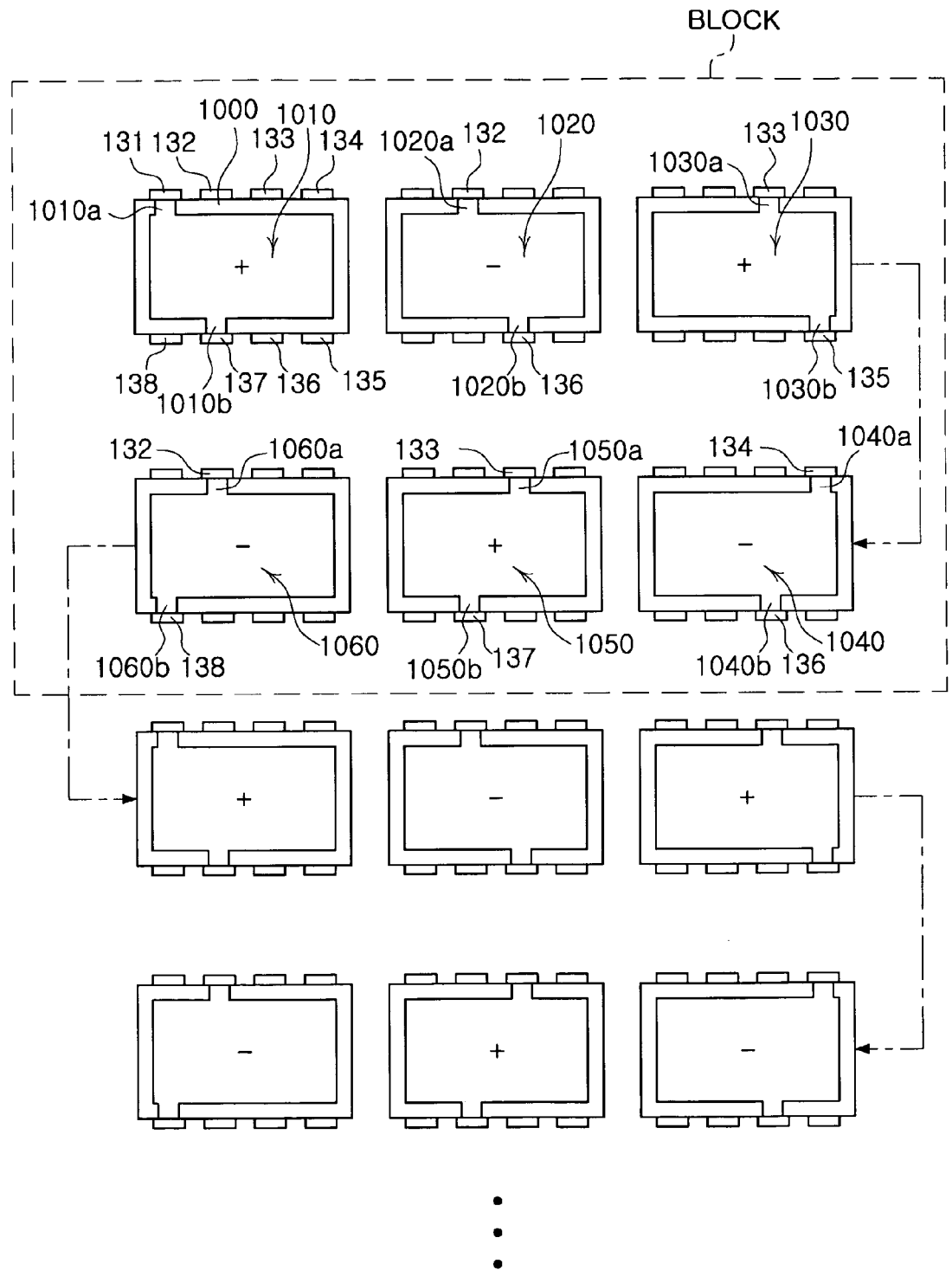
FIG. 2 is a cross-sectional view illustrating a structure of internal electrodes in a multilayer chip capacitor according to an embodiment of the present invention.
Figure 3:
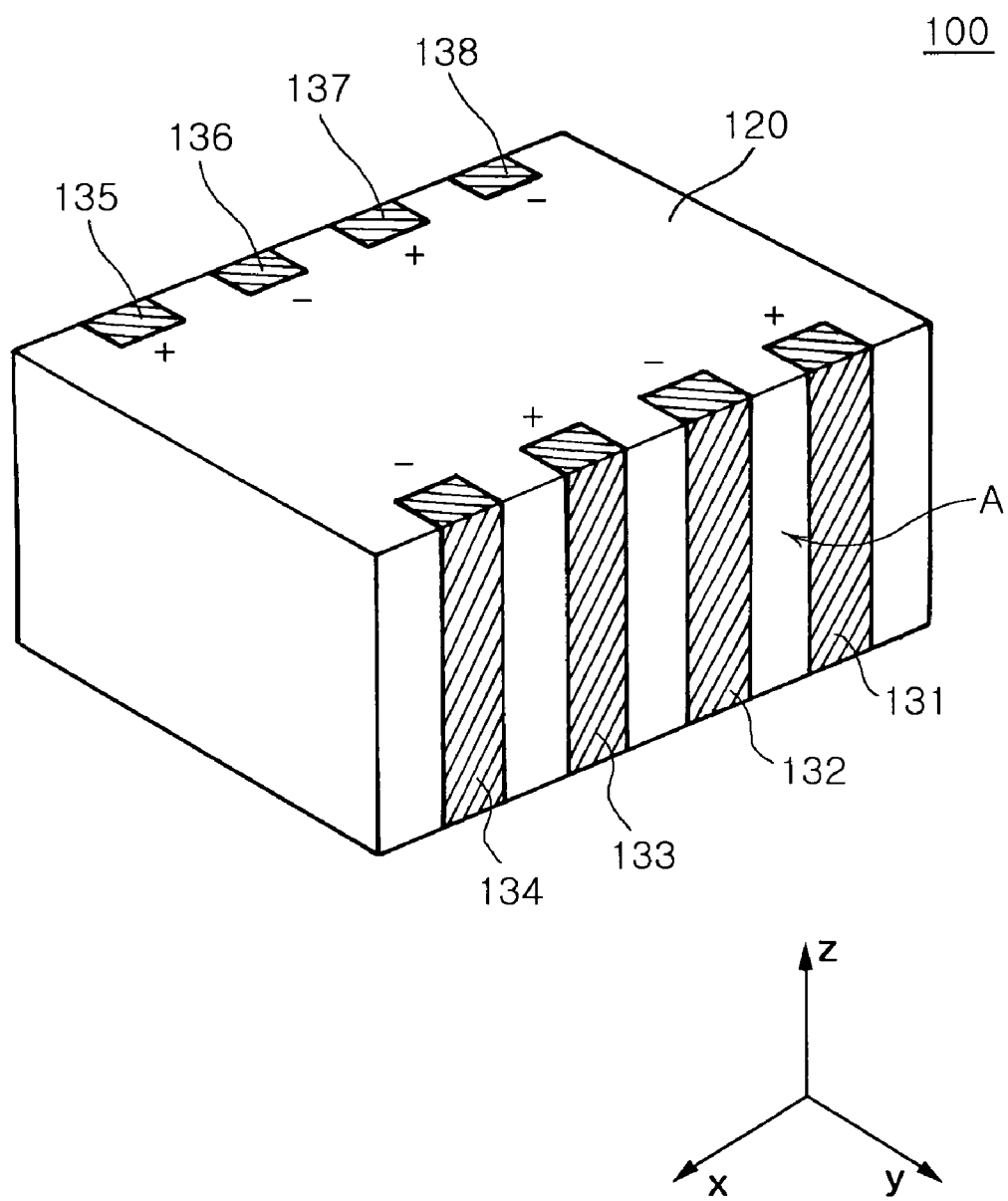
FIG. 3 is a perspective view illustrating an outer appearance of the multilayer chip capacitor of FIG. 2.

FIG. 2 is a cross-sectional view illustrating a structure of internal electrodes in a multilayer chip capacitor according to an embodiment of the present invention. FIG. 3 is a perspective view illustrating an outer appearance of the multilayer chip capacitor of FIG. 2. More specifically, the cross-sectional view is obtained by horizontally cutting the multilayer chip capacitor of FIG. 3 so as to expose the internal electrodes. In the embodiment shown in FIGS. 2 and 3, the multilayer chip capacitor is an 8-terminal capacitor having eight external electrodes.

Referring to FIGS. 2 and 3, the multilayer chip capacitor 100 includes a capacitor body 120 and eight external electrodes, that is, first to eighth external electrodes 131 to 138. The capacitor body 120 is formed by laminating a plurality of dielectric layers. In the capacitor body 120, a plurality of internal electrodes, that is, first to sixth internal electrodes 1010 to 1060: are disposed to be separated from each other by the dielectric layers 1000. The internal electrodes 1010 to 1060 are disposed so that the adjacent internal electrodes having opposite polarities face each other with the dielectric layers 1000 interposed therebetween to constitute a capacitance. The external electrodes having opposite polarities are alternately disposed on each of a first side surface A and a second side surface facing the first side surface A of the capacitor body 120.

Referring to FIG. 2, the six internal electrodes 1010 to 1060 are sequentially laminated to constitute one block. More specifically, the six internal electrodes 1010 to 1060 are sequentially disposed in a lamination direction (see an arrow of a dotted and dashed line) to constitute a unit (block) of a periodic lamination structure. The capacitor body 120 is formed by laminating the blocks repeatedly. In FIG. 2, one block indicated by a dotted line is set by six consecutive internal electrodes 1010, 1020, 1030, 1040, 1050, and 1060, where the starting internal electrode of the block is the internal electrode 1010. However, the starting internal electrode of the block may be arbitrarily designated. For example, sixth consecutive internal electrodes 1020, 1030, 1040, 1050, 1060, and 1010 from the starting internal electrode 1020 may constitute one block. Although the starting internal electrode is arbitrarily designated, one block includes six consecutive internal electrodes.

Each of the internal electrodes 1010 to 1060 has two leads 1010a and 1010b to 1060a and 1060b. The one of the two leads of each internal electrode, for example, the lead 1010a of the two leads 1010a and 1010b is drawn to the first side surface A, and the other, for example, the lead 1010b is drawn to the second side surface facing the first side surface A. Since each internal electrode has only two leads, an excessive decrease in equivalent series resistance (ESR) can be suppressed, so that a suitable ESR can be maintained.

As shown in FIG. 2, in each of the internal electrodes 1010 to 1060, a lead drawn to the first side surface is offset (shifted) by a distance between adjacent external electrodes from a position facing a lead drawn to the second side surface. For example, in the first internal electrode 1010, the lead 1010a drawn to the first side surface is offset by the distance between adjacent external electrodes leftwards from the lead 1010b drawn to the second side surface. The two of leads having the offset arrangement are disposed in a zigzag arrangement in the lamination direction (see FIG. 4(a)), so that all the internal electrodes having the same polarity are electrically connected to each other in the multilayer chip capacitor.

For example, the positive-polarity (+) first internal electrode 1010 is electrically connected to the positive-polarity (+) fifth internal electrode 1050 through the seventh external electrode 137 connected to the lead 1010b, and the positive-polarity (+) fifth internal electrode 1050 is electrically connected to the positive-polarity (+) third internal electrode 1030 through the third external electrode 133 connected to the lead 1050a. Therefore, all the positive-polarity (+) internal electrodes, that is, the first, third, and fifth internal electrodes 1010, 1030, and 1050 are electrically connected to each other in the multilayer chip capacitor.

Similarly, the negative-polarity (−) first internal electrode 1020 is electrically connected to the negative-polarity (−) sixth internal electrode 1060 through the second external electrode 132 connected to the lead 1020a, and is also electrically connected to the negative-polarity (−) fourth internal electrode 1040 through the sixth external electrode 136 connected to the lead 1020b. Therefore, all the negative-polarity (−) internal electrodes, that is, the second, fourth, and sixth internal electrodes 1020, 1040, and 1060 are electrically connected to each other in the multilayer chip capacitor.

Since all the internal electrodes having the same polarity are electrically connected to each other in the multilayer chip capacitor without electrode pads of an external circuit or external connector means, it is possible to easily test or measure the electrostatic capacitance after the production of the multilayer chip capacitor. More specifically, since all the internal electrodes having the same polarity are connected to each other in the multilayer chip capacitor, the electrostatic capacitance can be easily tested by contacting positive and negative probes to only two opposite-polarity external electrodes. However, if any one of the internal electrodes were not connected to other internal electrodes having the same polarity, the multilayer chip capacitor would need to be mounted on an external circuit board having connection means such as electrode pads or it would need to use an external connector in order to test a total capacitance of the capacitor.

According to the embodiment, as seen from the lamination direction (z direction), leads of up-down-direction adjacent opposite-polarity internal electrodes (for example, a positive-polarity (+) lead 101a (or 1010b) and a negative-polarity (−) 1020a (or 1020b)) are disposed to be adjacent to each other. Therefore, it is possible to minimize equivalent series inductance (ESL) of the multilayer chip capacitor.

According to the embodiment, as seen from each side surface, the leads drawn to the side surface of the capacitor body 120 are disposed in a zigzag arrangement in the lamination direction. The zigzag arrangement is shown in FIG. 4(a).

Figure 4A:
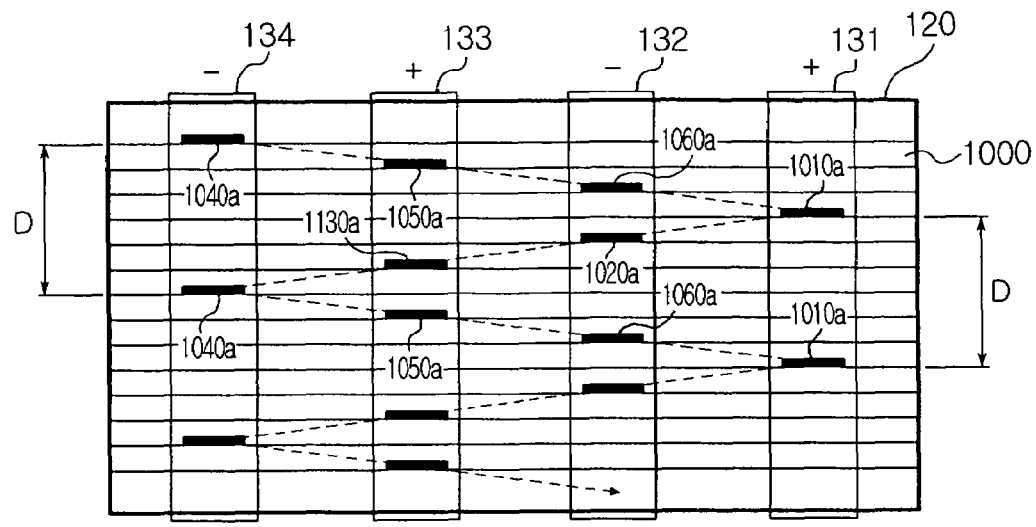
FIGS. 4(a) and 4(b) are side views illustrating lead arrangements of leads drawn to one side surface of a capacitor body in the multilayer chip capacitor according to the embodiment of the present invention and a conventional multilayer chip capacitor, respectively.
Figure 4B:
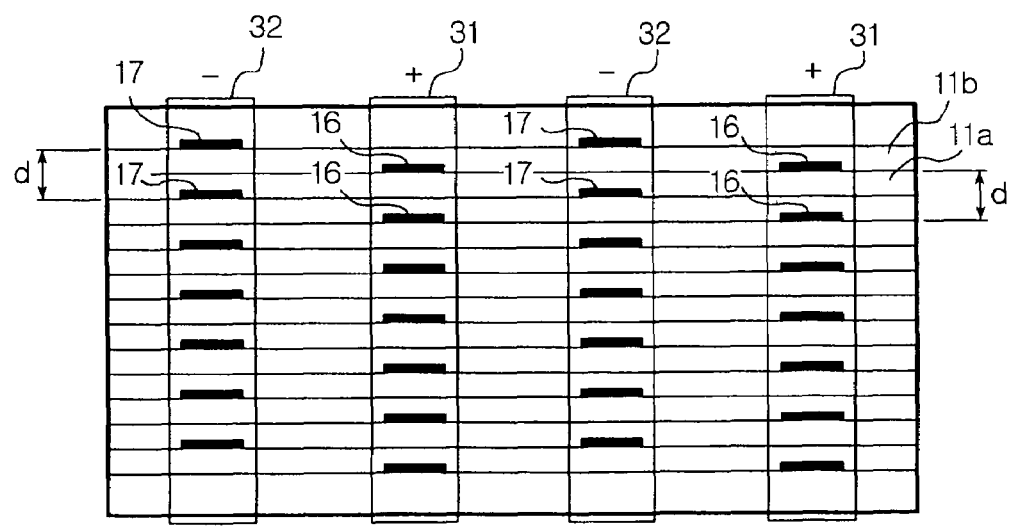

FIG. 4(a) illustrates a lead arrangement of the leads drawn to the first side surface A of the capacitor body 120 in the multilayer chip capacitor of FIG. 2. FIG. 4(b) illustrates a lead arrangement of leads drawn to one side surface of a capacitor body of a conventional multilayer chip capacitor (see FIG. 1A).

Referring to FIG. 4(a), the leads 1010a, 1020a, 1030a, and 1040a of the first to fourth internal electrodes drawn to the first side surface A are disposed to be connected to the first to fourth external electrodes 131, 132, 133, and 134. The lead 1050a of the fifth internal electrode is disposed to be connected to the third external electrode 133. The lead 1060a of the sixth internal electrode is disposed to be connected to the second external electrode 132. Such a lead arrangement is repeated in the blocks, so that the leads drawn to the first side surface of the capacitor body 120 are disposed in a zigzag arrangement in the lamination direction. Similarly, the leads drawn to the second side surface of the capacitor body 120 are disposed in a zigzag arrangement in the lamination direction (see FIG. 2).

Due to the zigzag lead arrangement, mutual inductance between the adjacent leads having the same polarity which are adjacent to each other in the up-down direction (lamination direction) can be reduced. As shown in FIG. 4(a), an average distance between the up-down-direction adjacent leads connected to the same external electrode is larger than a thickness of two dielectric layers. For example, the distance between the up-down-direction adjacent leads 1010a connected to the external electrode 131 substantially corresponds to a thickness D of six dielectric layers 1000. Since the distance between the up-down-direction adjacent leads having the same polarity is large, the mutual inductance generated from magnetic coupling therebetween can be reduced or suppressed. Therefore, the ESL of the multilayer chip capacitor can be further reduced.

Figure 1B:
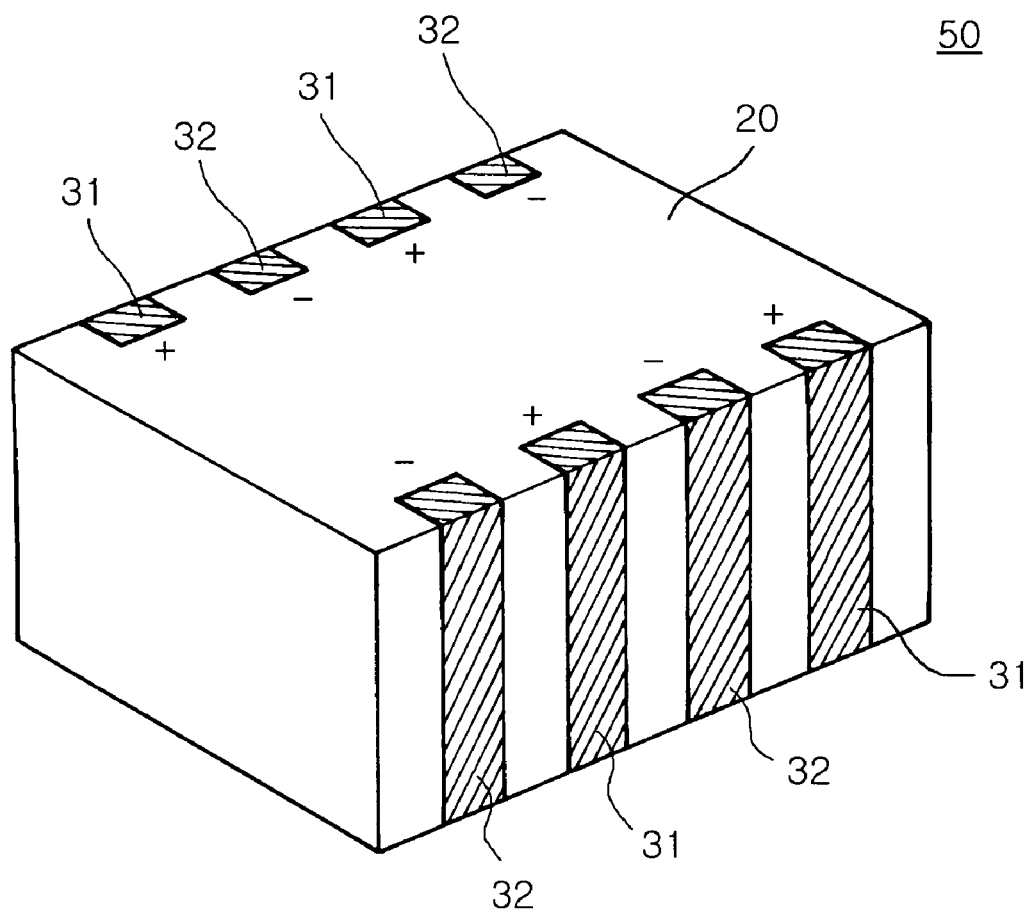
FIG. 1B is a perspective view illustrating an outer appearance of the multilayer chip capacitor of FIG. 1A.

On the contrary, in the conventional multilayer chip capacitor (see FIGS. 1A and 1B), the zigzag lead arrangement is not provided. As shown in FIG. 4(b), in the conventional multilayer chip capacitor, the distance between the up-down-direction adjacent leads connected to the same external electrode is relatively small. For example, the distance between the up-down-direction adjacent leads 16 connected to the external electrode 31 corresponds to a thickness d of two dielectric layers. Therefore, strong mutual inductance is generated between the leads having the same polarity, so that the ESL of the conventional multilayer chip capacitor becomes large.

Figure 5:
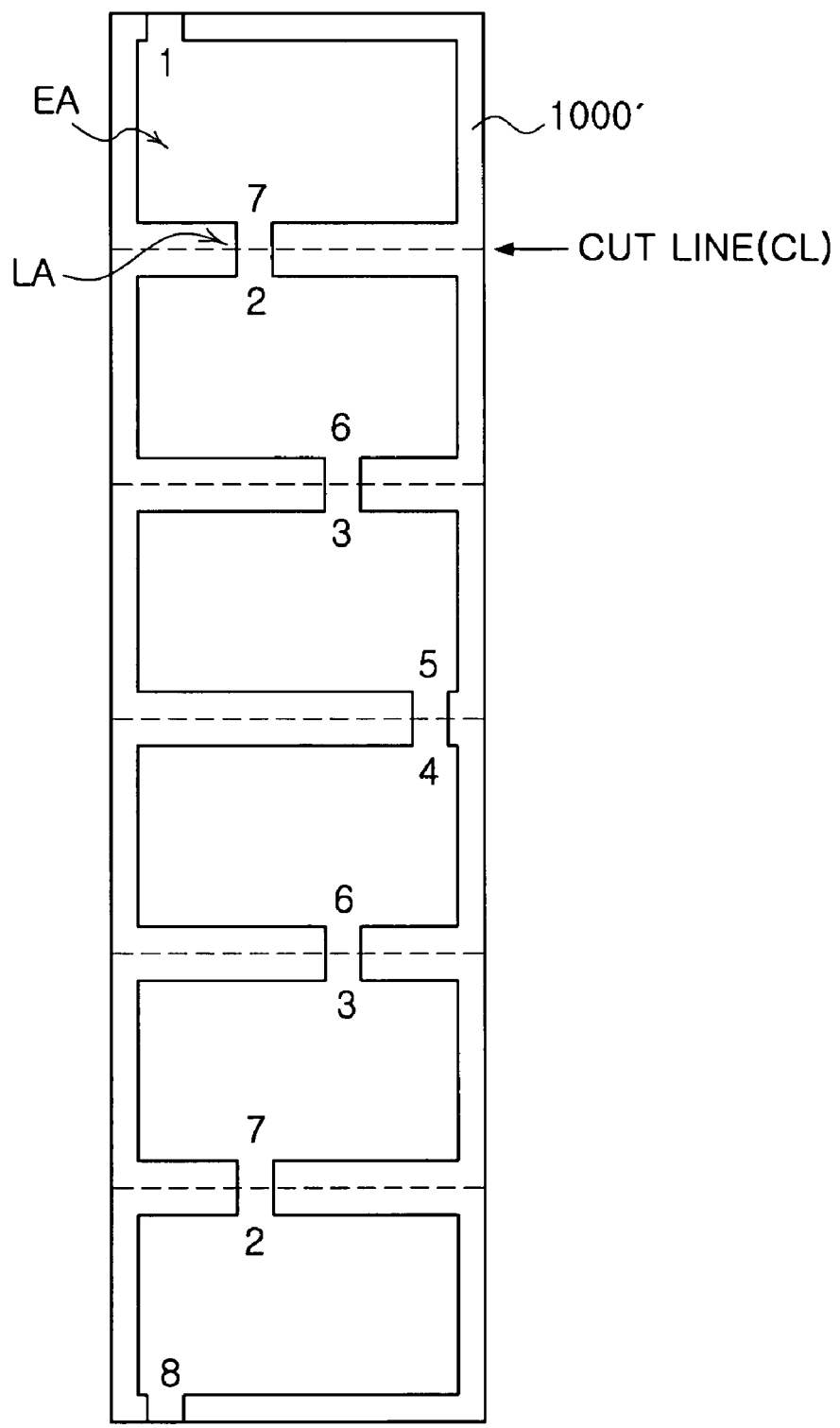
FIG. 5 is a plan view illustrating an example of a print screen pattern for internal electrodes of the multilayer chip capacitor of FIG. 2.

FIG. 5 is a plan view illustrating an example of a print screen pattern for internal electrodes of the multilayer chip capacitor 100 of FIG. 2. The internal electrodes are formed on a dielectric layer or green sheet in an electrode pattern region EA opened by a screen region 1000'. Using the print screen pattern shown in FIG. 5, the lead regions of the up-down direction adjacent internal electrodes which are to be adjacent to each other in the lamination direction are abutted on each other or joined to each other. For example, the lead region 7 corresponding to reference numeral 1010b and the lead region 2 corresponding to reference numeral 1020b are abutted on each other. The lead regions of the up-down direction adjacent internal electrodes are abutted on each other in the layout of the print screen pattern so as to constitute one pattern region LA. Therefore, although there is an error of a cutting process during the production processes, the leads cannot be opened from the external electrodes.

Figure 6:
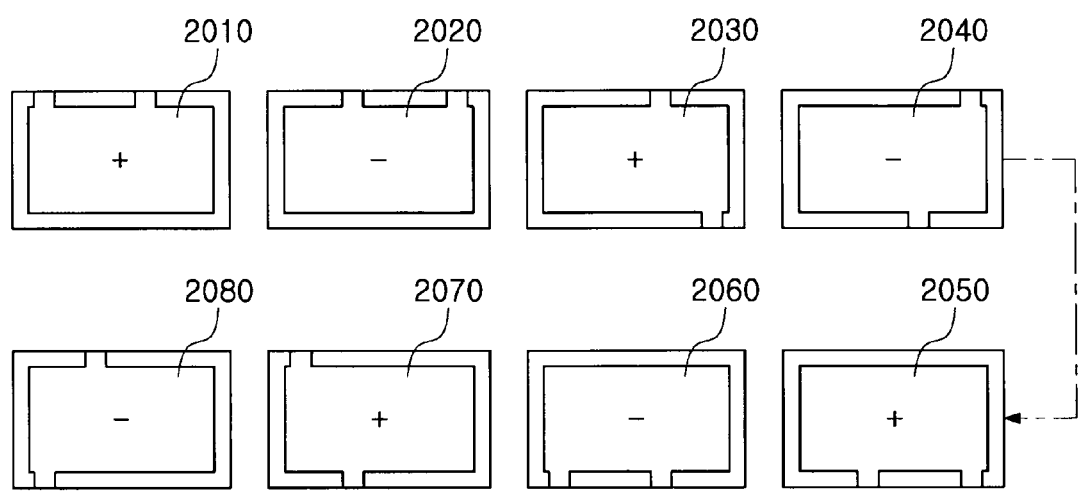
FIG. 6 is a cross-sectional view illustrating a structure of internal electrodes in a multilayer chip capacitor according to another embodiment of the present invention.

FIG. 6 is a cross-sectional view illustrating a structure of internal electrodes in a multilayer chip capacitor according to another embodiment of the present invention. In the embodiment, eight internal electrodes 2010 to 2080 are sequentially laminated to constitute one block. Each of the internal electrodes 2010 to 2080 has two leads. Particularly, each of the internal electrodes 2010 and 2020 have two leads drawn to the first side surface, and each of the internal electrodes 2050 and 2060 have two leads drawn to the second side surface. Each of the internal electrodes 2030, 2040, 2070, and 2080 has one lead drawn to the first side surface and one lead drawn to the second side surface. The multilayer chip capacitor of FIG. 6 has the same outer appearance as that of FIG. 3.

Similarly, in the embodiment of FIG. 6, the leads of the up-down-direction adjacent opposite-polarity internal electrodes are disposed to be adjacent to each other, so that the ESL of the multilayer chip capacitor can be reduced. In addition, all the internal electrodes having the same polarity are connected to each other in the multilayer chip capacitor, so that the electrostatic capacitance can be easily tested. In addition, each of the internal electrodes has only two leads, so that an excessive decrease in ESR can be suppressed.

FIGS. 7 to 10 are cross-sectional views illustrating structures of internal electrodes in multilayer chip capacitors according to still other embodiments of the present invention. In the embodiments, the multilayer chip capacitors are also 8-terminal capacitors, and outer appearances of the multilayer chip capacitors are the same as that of FIG. 3.

Figure 7:
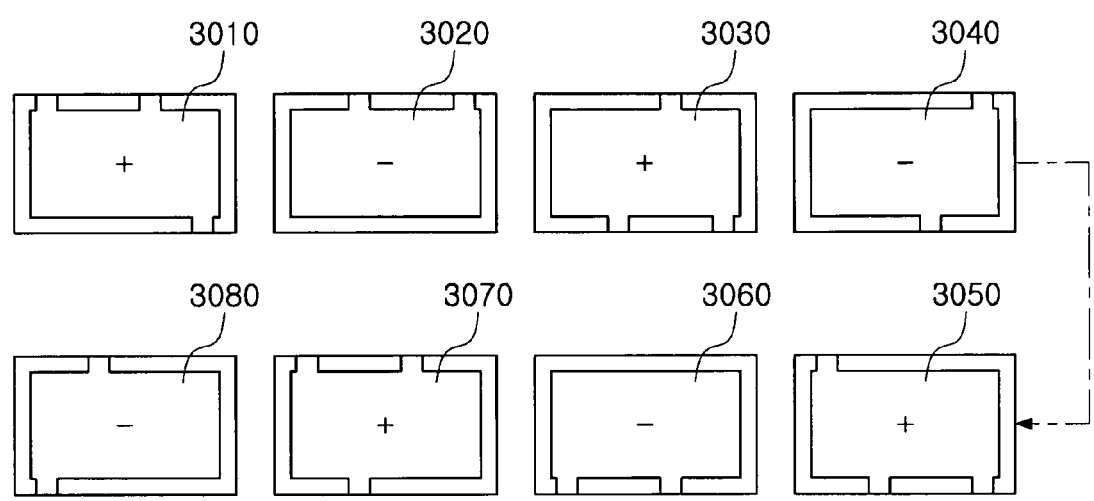
FIGS. 7 to 13 are cross-sectional views illustrating structures of internal electrodes in multilayer chip capacitors according to still another embodiments of the present invention.

As shown in FIG. 7, each internal electrode needs not to have only two leads. For example, some of the eight internal electrodes constituting one block may have two leads, and others may have three leads. More specifically, each of the internal electrodes 3020, 3040, 3060 and 3080 may have two leads, and each of the internal electrodes 3010, 3030, 3050, and 3070 may have three leads. In this case, the average number of leads in each internal electrode is 2.5 (=(2+2+2+2+3+3+3+3)/8).

Figure 8:
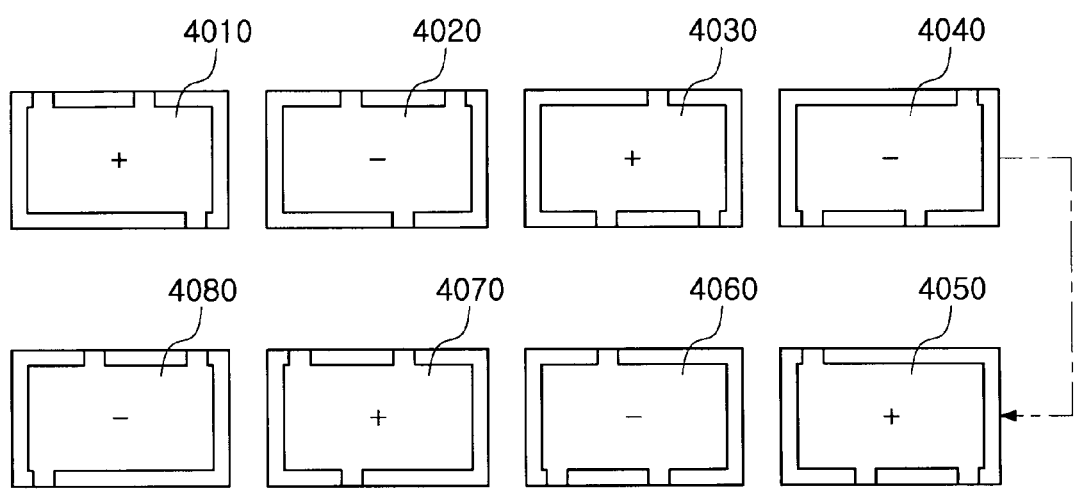
Figure 9:
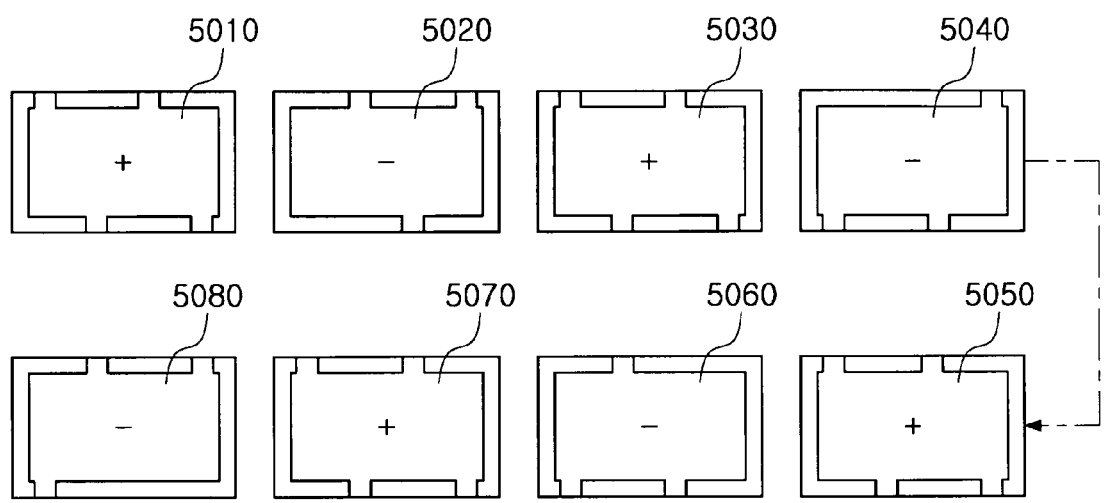

Alternatively, as shown in FIG. 8, each of eight internal electrodes 4010 to 4080 constituting one block may have three leads. Alternatively, as shown in FIG. 9, each of eight internal electrodes 5010 to 5080 constituting one block may have three or four leads.

Figure 10:
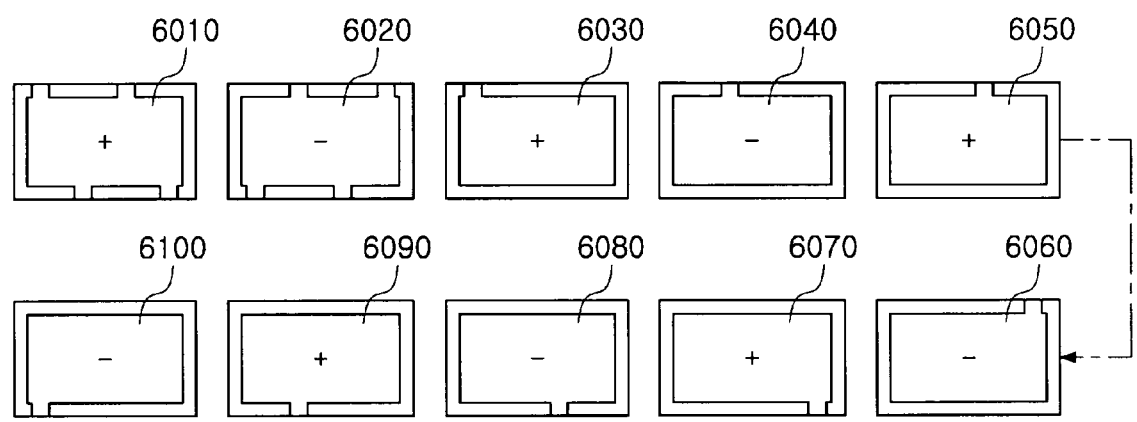

Furthermore, as shown in FIG. 10, ten internal electrodes 6010 to 6100 can constitute one block. In this case, each of the internal electrodes 6010 to 6100 may have four leads or one lead. Particularly, each of the internal electrodes 6010 and 6020 have four leads, and opposite-polarity leads of each of the internal electrodes 6010 and 6020 are disposed to be adjacent to each other. In this case, each of the remaining eight internal electrodes 6030 to 6100 may have one lead. The internal electrodes 6010 and 6020 having four leads have a function of connecting the internal electrodes having the same polarity.

Figure 11:
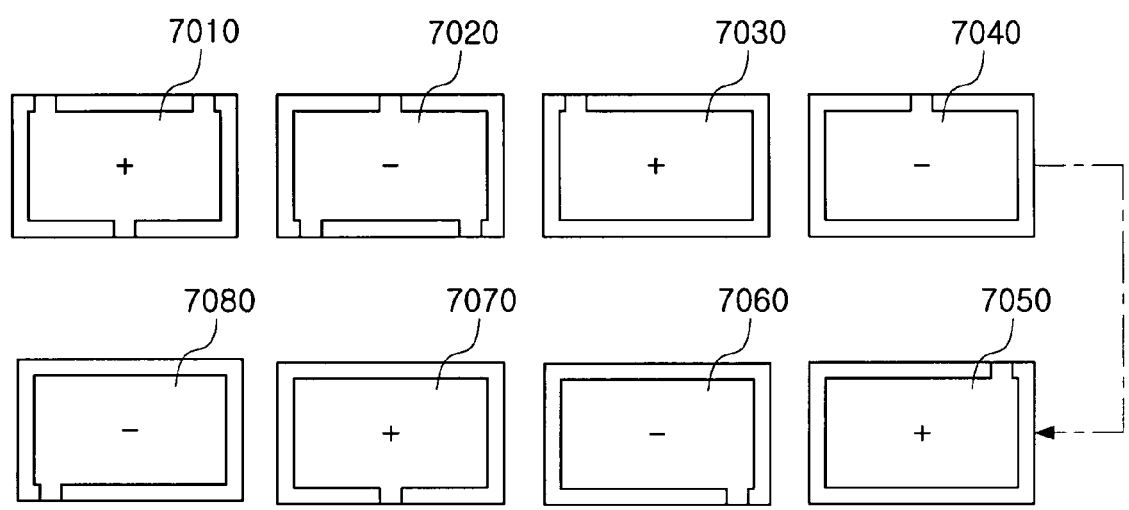
Figure 12:
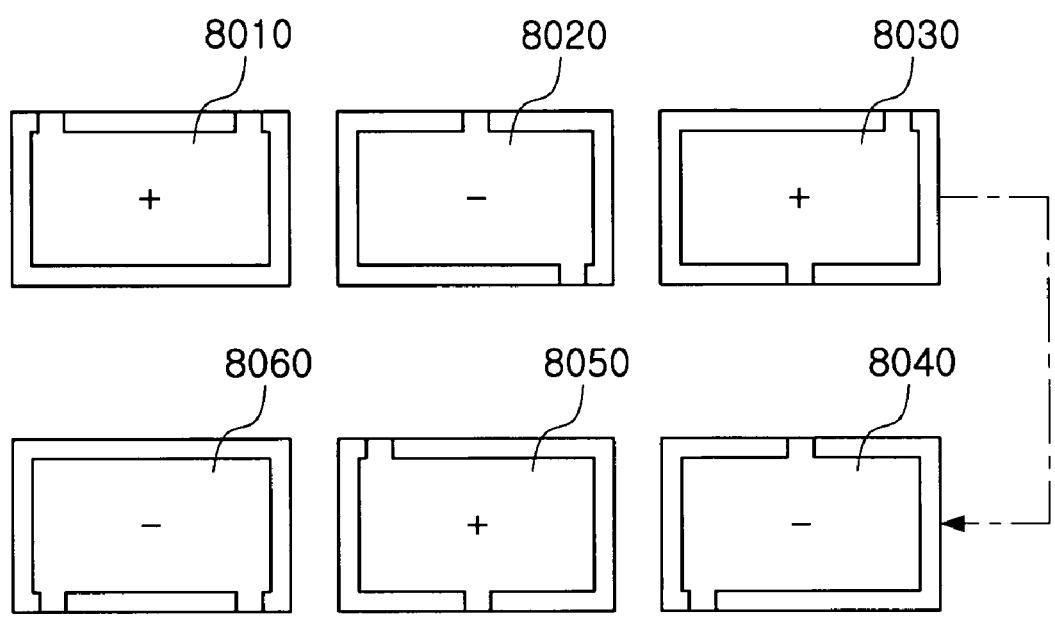
Figure 13:
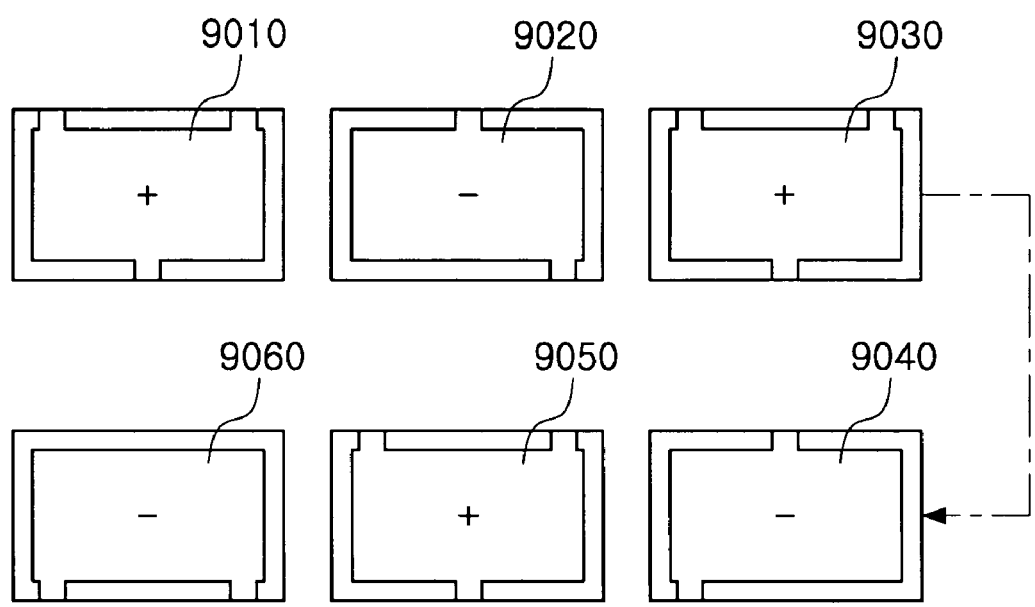
Figure 14:
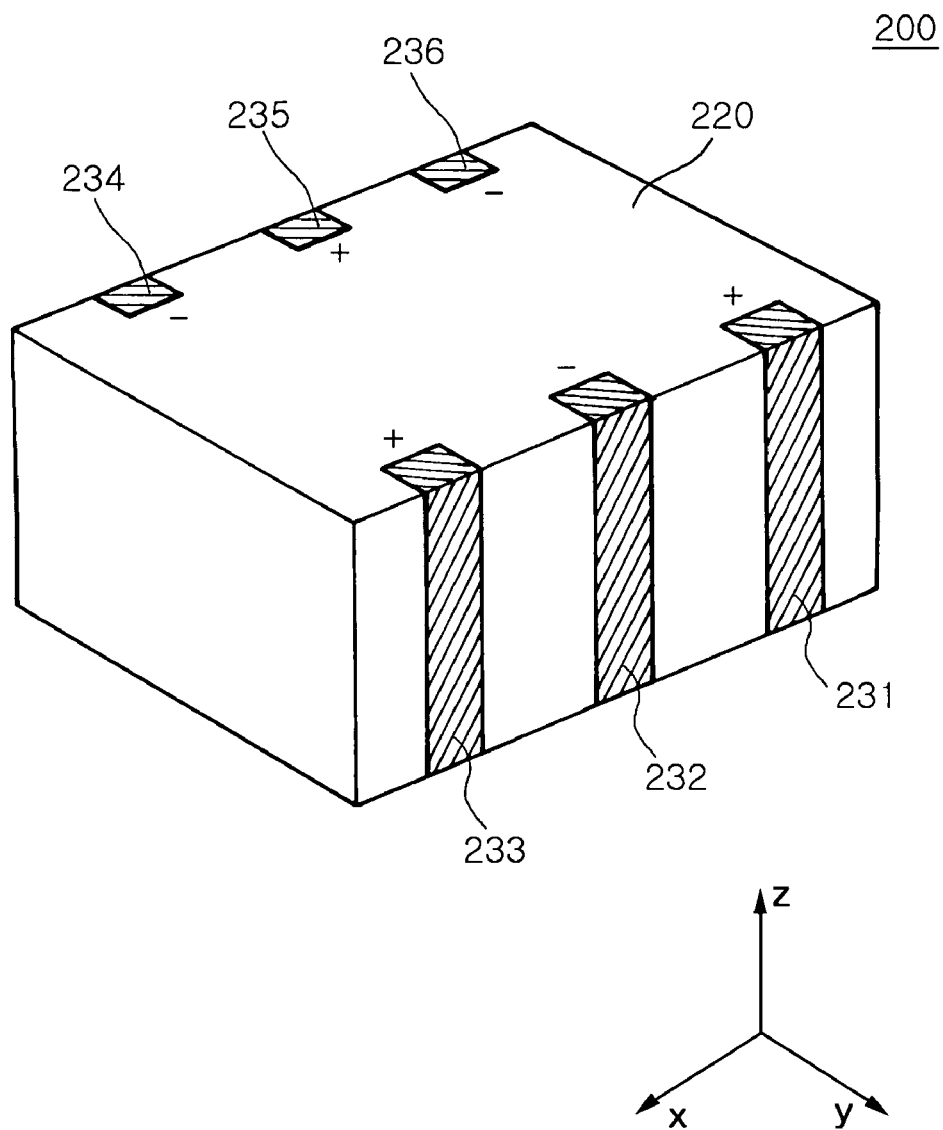
FIG. 14 is a perspective view illustrating an outer appearance of a multilayer chip capacitor according to further still another embodiment of the present invention.

In addition, a multilayer chip capacitor according to the present invention is not limited to an 8-terminal capacitor. For example, in an embodiment of the present invention, the multilayer chip capacitor may be 6-terminal capacitor. These examples are illustrated in FIGS. 11 to 13. The multilayer chip capacitors of FIGS. 11 to 13 may have the same outer appearance as that of the multilayer chip capacitor 200 of FIG. 14.

Referring to FIG. 11, eight internal electrodes 7010 to 7080 constitute one block, and each of the internal electrodes 7010 to 7080 has three leads or one lead. More specifically, among the eight internal electrodes 7010 to 7080, each of the two internal electrodes 7010 and 7020 has three leads, and each of the remaining six internal electrodes 7030 to 7080 has one lead. In this case, the two internal electrodes 7010 and 7020 have a function of connecting the internal electrodes having the same polarity. For example, the internal electrode 7010 allows the positive-polarity (+) internal electrodes 7030, 7050, and 7070 to be connected to each other by using the three leads of the internal electrode 7010 and three external electrodes 231, 233, and 235 connected to the three leads. Similarly, the internal electrode 7020 allows the negative-polarity (−) internal electrodes 7040, 7060, and 7080 to be connected to each other by using the three leads of the internal electrode 7020 and three external electrodes 232, 234, and 236 connected to the three leads.

In the 6-terminal capacitor of FIG. 12, six internal electrodes 8010 to 8060 are sequentially laminated to constitute one block. Particularly, each of the internal electrodes 8010 to 8060 has two leads.

In the 6-terminal capacitor of FIG. 13, six internal electrodes 9010 to 9060 are sequentially laminated to constitute one block. Referring to FIG. 13, each of the internal electrodes 9010 to 9060 has two or three leads. Particularly, each of the three internal electrodes 9010, 9030, and 9050 has three leads, and each of the remaining three internal electrodes 9020, 9040, and 9060 has two leads.

Similarly, in the embodiments of FIGS. 7 to 13, the leads of the up-down-direction adjacent opposite-polarity internal electrodes are disposed to be adjacent to each other, so that the ESL of the multilayer chip capacitor can be reduced. In addition, all the internal electrodes having the same polarity are connected to each other in the multilayer chip capacitor, so that the electrostatic capacitance can be easily tested. In addition, an average number of leads in each internal electrode is smaller than half of the total number of external electrodes, so that an excessive decrease in ESR can be suppressed.

While the present invention has been shown and described in connection with the exemplary embodiments, it will be apparent to those skilled in the art that modifications and variations can be made without departing from the spirit and scope of the invention as defined by the appended claims. For example, in a multilayer chip capacitor according to the present invention, the shape of internal electrode or the number of external electrodes may be different from those of the aforementioned embodiment.

What is claimed is:

1. A multilayer chip capacitor comprising:
    a capacitor body formed by laminating a plurality of dielectric layers;
    a plurality of internal electrodes disposed in the capacitor body, each of the internal electrodes having one or more lead drawn to a side surface of the capacitor body, the internal electrodes of opposite polarities alternately disposed to face each other with the dielectric layer interposed therebetween;
    a plurality of external electrodes disposed on first and second side surfaces facing each other of the capacitor body to extend in a lamination direction and to be electrically connected to the internal electrodes through the leads, the external electrodes of opposite polarities alternately disposed on each of the first and second side surfaces;
    wherein the internal electrodes constitute a plurality of blocks stacked repeatedly one atop another, each of the blocks including a plurality of the internal electrodes which are arranged successively in the lamination direction,
    wherein an average number of leads in each internal electrode is smaller than half of the total number of the external electrodes, and
    wherein the leads of the internal electrodes having opposite polarities and adjacent in the lamination direction are disposed to be adjacent to each other as seen from the lamination direction, and
    wherein all the internal electrodes having the same polarity are electrically connected to each other by the external electrodes.

2. The multilayer chip capacitor of claim 1,
    wherein each of the internal electrodes has two leads of the one lead drawn to the first side surface and the other lead drawn to the second side surface,
    wherein, in each of the internal electrodes, the one lead drawn to the first side surface is offset by a distance between adjacent external electrodes from a position facing the lead drawn to the second side surface, and
    wherein the leads drawn to each of the first and second side surfaces are disposed in a zigzag arrangement in the lamination direction as seen from each side surface.

3. The multilayer chip capacitor of claim 1,
    wherein the multilayer chip capacitor is an 8-terminal capacitor having four external electrodes on each of the first and second side surfaces,
    wherein the first to fourth external electrodes are sequentially disposed on the first side surface, and
    wherein the fifth to eighth external electrodes are sequentially disposed on the second side surface.

4. The multilayer chip capacitor of claim 3, wherein in the 8-terminal capacitor, the first to sixth internal electrodes are sequentially laminated to constitute each of the blocks.

5. The multilayer chip capacitor of claim 4,
    wherein each of the first to sixth internal electrodes has two leads of the one lead drawn to the first side surface and the other lead drawn to the second side surface,
    wherein the leads of the first to fourth internal electrodes drawn to the first side surface are disposed to be connected to the first to fourth external electrodes, the leads of the fifth internal electrode drawn to the first side surface are disposed to the third external electrode, and the leads of the sixth internal electrode drawn to the first side surface are disposed to second external electrode,
    wherein the leads drawn to the second side surface are disposed in a zigzag arrangement in the lamination direction between the fifth external electrode and the eighth external electrode as seen from the second side surface, and
    wherein, in each of the internal electrodes, the lead drawn to the second side surface is offset by a distance between adjacent external electrodes from a position facing the lead drawn to the first side surface.

6. The multilayer chip capacitor of claim 3, wherein eight internal electrodes are sequentially laminated to constitute each of the blocks.

7. The multilayer chip capacitor of claim 6, wherein each of the internal electrodes has two leads.

8. The multilayer chip capacitor of claim 7,
    wherein each of the two internal electrodes among the eight internal electrodes has two leads drawn to the first side surface,
    wherein each of the other two internal electrodes has two leads drawn to the second side surface, and
    wherein each of the remaining four internal electrodes has two leads of the one lead drawn to the first side surface and the other drawn to the second side surface.

9. The multilayer chip capacitor of claim 6, wherein each of the internal electrodes has at least one lead and at most four leads.

10. The multilayer chip capacitor of claim 9, wherein each of the internal electrodes has three or two leads.

11. The multilayer chip capacitor of claim 9, wherein each of the internal electrodes has three leads.

12. The multilayer chip capacitor of claim 9, wherein each of the internal electrodes has three or four leads.

13. The multilayer chip capacitor of claim 3, wherein ten internal electrodes are sequentially laminated to constitute each of the blocks.

14. The multilayer chip capacitor of claim 13,
    wherein each of the two internal electrodes among the ten internal electrodes has four leads,
    wherein each of the remaining eight internal electrodes has one lead,
    wherein the eight internal electrodes having one lead include four internal electrodes having a lead drawn to the first side surface and four internal electrodes having a lead drawn to the second side surface.

15. The multilayer chip capacitor of claim 1, wherein the multilayer chip capacitor is a 6-terminal capacitor having three external electrodes on each of the first and second side surfaces.

16. The multilayer chip capacitor of claim 15, wherein eight internal electrodes are sequentially laminated to constitute each of the blocks.

17. The multilayer chip capacitor of claim 16,
    wherein each of the two internal electrodes among the eight internal electrodes has three leads,
    wherein each of the remaining six internal electrodes has one lead, and
    wherein the six internal electrodes having one lead include three internal electrodes having a lead drawn to the first side surface and three internal electrodes having a lead drawn to the second side surface.

18. The multilayer chip capacitor of claim 15, wherein six internal electrodes are sequentially laminated to constitute each of the blocks.

19. The multilayer chip capacitor of claim 18, wherein each of the internal electrodes has two leads.

20. The multilayer chip capacitor of claim 18, wherein each of the three internal electrodes among the six internal electrodes has two leads, and wherein each of the remaining three internal electrodes has three leads.

\* \* \* \* \*